March 6, 1962 W. H. COX ETAL 3,023,966
CORRELATOR FOR THE ANALYSIS OF SEISMIC RECORDS
Filed June 24, 1955 3 Sheets-Sheet 1

INVENTORS
WILLIAM H. COX &
BY NORMAN B. BLAKE

ATTORNEYS (1) $$\phi_{12} = \frac{1}{2T}\int_{-T}^{T} f_1(t+\tau) \cdot f_2(t-\tau) \cdot G(\tau) \cdot d\tau$$

(2) $$\phi_{12} \approx \frac{1}{2n}\sum_{K=-n}^{n} f_1(t+K\Delta t) \cdot f_2(t-K\Delta t) \cdot G(K\Delta t)$$

(3) $$\phi_{12} \approx \frac{1}{2T}\int_{-T}^{T} \{|f_1(t+\tau)+f_2(t-\tau)| - |f_1(t+\tau)-f_2(t-\tau)|\} G(\tau) \cdot d\tau$$

(4) $$\phi_{12} \approx \frac{1}{2n}\sum_{K=-n}^{n} \{|f_1(t+K\Delta t)+f_2(t-K\Delta t)| - |f_1(t+K\Delta t)-f_2(t-K\Delta t)|\} G(K\Delta t)$$

(5) $$\phi_{12} \approx f_1(t+\tau_0) \cdot f_2(t-\tau_0) + f_1(t-\tau_0) \cdot f_2(t+\tau_0)$$

FIG. 4.

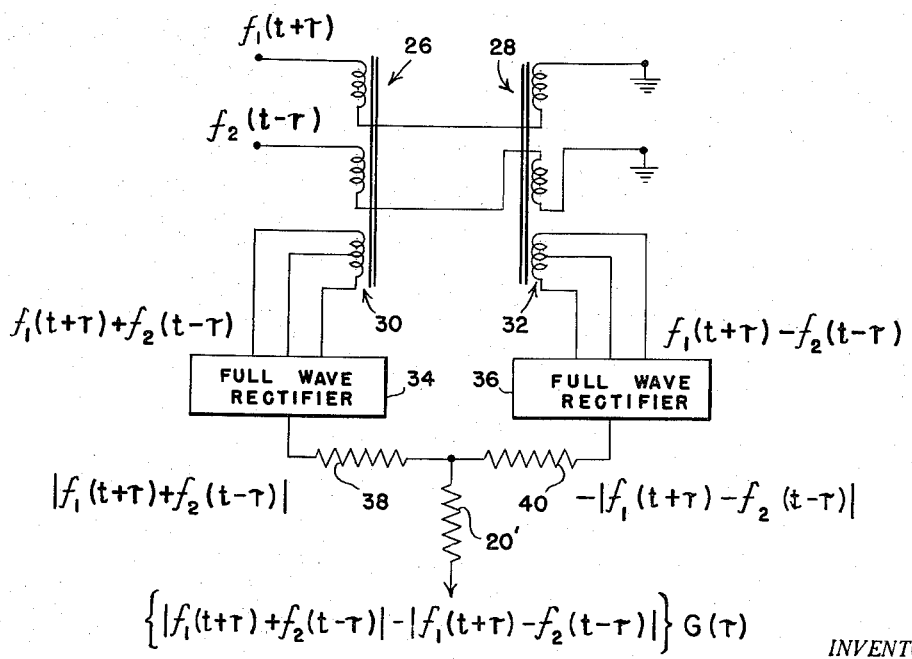

FIG. 5.

INVENTORS
WILLIAM H. COX &
NORMAN B. BLAKE
BY
ATTORNEYS

United States Patent Office 3,023,966
Patented Mar. 6, 1962

3,023,966
CORRELATOR FOR THE ANALYSIS OF SEISMIC RECORDS
William H. Cox and Norman B. Blake, Beaumont, Tex., assignor to Sun Oil Company, Philadelphia, Pa., a corporation of New Jersey
Filed June 24, 1955, Ser. No. 517,776
11 Claims. (Cl. 235—181)

This invention relates to methods and apparatus for the analysis of seismic records and has particular reference to the accentuation of reflections against background noise.

A major problem in seismic reflection geophysical exploration is that of recognition of reflection records against background noise. Filters are, accordingly, used since experience has shown that certain frequency bands are primarily involved in the desired signals and, consequently, by filtering the detected signals there is achieved some segregation of the desired signals from those which have frequencies outside the pass bands of the filters and are of no interest. Design of a conventional filter, however, necessarily involves a compromise since the desired signals actually contain a very broad band of frequencies and removal of any frequency components will also remove some components of the desired signal. In any event, filtering causes a substantial change in the waveform of the desired signals and reflections cannot be so readily recognized by those having experience in this art, since recognition is to a considerable extent by virtue of waveform. Furthermore, it is difficult to design a simple filter with the required amplitude versus frequency response which also has linear phase shift with frequency or zero delay distortion.

Recognition must also be given, in the design of filters, to the fact that the reflections which it is desired to detect are essentially transients. A filter which may appear satisfactory on a basis of frequency response and phase shift may be unsatisfactory due to poor transient properties. A poorly designed filter will produce essentially the same characteristic damped wave train output for any transient impulse applied to it. This "ringing" effect due to stored energy in reactive elements is present to some extent in any conventional filter.

In the application of William H. Cox, Serial No. 464,843, filed October 26, 1954, now abandoned, there is described a procedure which may be described from a broad standpoint as filtering or equally well well as correlation. In accordance with the procedure of said application, a record made by a seismograph is "scanned" against a theoretical type of waveform, in the sense that the product of the amplitude of such waveform with a portion of the seismic record is integrated over a suitable interval to give rise to a derived record in which the reflections are accentuated. The theoretical type of waveform so used is that which has been computed as theoretically appearing at a detector as the result of reflection in the earth of a pulse resulting from a shot. The computation is based on theoretical assumptions, but it does appear that what actually occurs in practice conforms reasonably with the theoretical.

Much effort has been devoted to the correlation of records made at several detectors from a single shot or records made under other conditions where theoretically correlation may have significance. Such correlation studies have involved elaborate calculation and up to the present time have generally not yielded results which, considering the elaborateness of the calculations required, would justify practical use of the correlation methods employed.

The automatic correlation of a pair of seismic records utilizing directly those made by magnetic or photographic recording poses an immediate problem in that if the records are run through an apparatus simultaneously the corresponding significant events (transients) thereon cannot be expected to appear at pickup means simultaneously. An attempt may be made to bring the records into time correspondence through the usual weathering, elevation, and step-out corrections, but these corrections can only be approximately made and not to an extent that the corresponding events will be picked up simultaneously for correlation. In fact, the deviations from theoretical step-outs based on simplified assumptions may be of particular significance as indicative of sloping reflection horizons or other subsurface conditions so that it might well be said that if complete correction of the records were made the procedure in making the corrections would practically eliminate the necessity for correlation. Pairs of seismic records could, of course, be repeatedly automatically correlated with slight time shifts prior to each repetition. Such a procedure, however, would be extremely tedious as would also be the case of the final studies of the correlation records.

In comparison with the scanning against a theoretical waveform as in said Cox application, there would be considerable theoretical advantage in corresponding "scanning" against actual waveforms which may exist. Considering the assumptions which must be made in arriving at a theoretical waveform, it is evident that the actual reflection waveform must depend to a substantial extent upon those unknown factors which it is the object of the seismic prospecting to determine. Thus, there is a theoretical advantage in attempting to correlate one record against another where, in a sense, it may be considered that the second record establishes the waveform which it is desired to find in the first.

Furthermore, while the present application is directed primarily to the analysis of seismic records, it is also applicable to the correlation of well logging records. In the case of the latter, there cannot be derived any particular waveform which would characterize, for example, the logging across a boundary; but correlation of records made in different wells can be carried out since for passage over a single characteristic boundary the waveform generated will be essentially the same in the two records.

In accordance with the present invention, advantage is taken of the symmetry, either mirror or skew, of the transient waveform which is of interest. When such symmetry exists, the waveforms on two records may be correlated against each other in a reverse sense, i.e., the onset portion of one transient may be correlated with the trailing portion of the other. Such correlation is, furthermore, so carried out in accordance with the invention that the fact that the corresponding transients may be displaced on the records is immaterial, so long as the displacement is not excessive. The extent to which they are out of time alignment may, furthermore, be measured to derive significance therefrom.

The objects of the invention having to do with correlation as indicated above will be clear from the following description read in conjunction with the accompanying drawings, in which:

FIGURE 4 is a set of expressions involved in operations in accordance with the invention;

FIGURE 5 is a wiring diagram showing apparatus for attaining an approximation to a product, with pertinent expressions explanatory of its operation.

Figure 2:
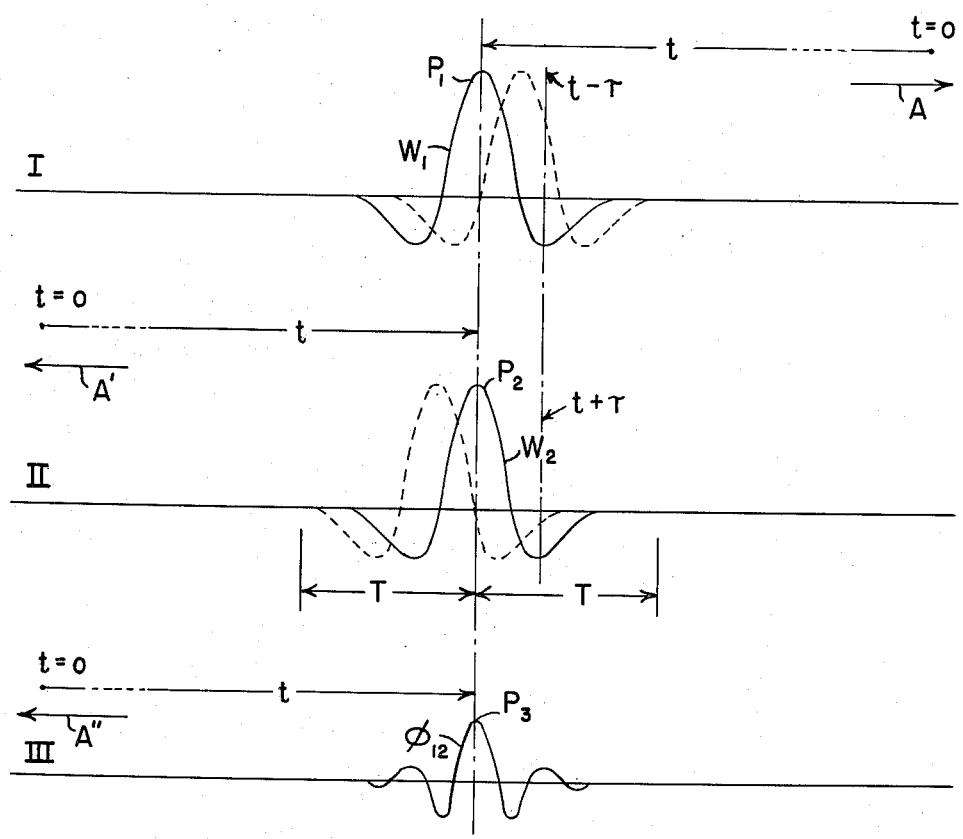
FIGURE 2 is a diagram illustrative of the principles of the invention herein involved.

Reference will first be made to FIGURE 2 which indicates the nature of the correlation method involved. In effect, in accordance with the invention, two seismic records to be correlated are simultaneously fed in "opposite directions" through a scanning zone. This reference to "opposite directions" is not literally mechanically significant but will be found convenient for purposes of discussion and has a signficance which will presently appear. The seismic records which are to be correlated will, of course, contain much "noise" within which the transients signifying reflections may be so submerged as not to be clearly discernible. For simplicity of explanation, there are indicated in FIGURE 2 only corresponding reflection transients of two records, the attendant noise being omitted. The transients are respectively indicated as $W_1$ and $W_2$. Let it be assumed that these transients occur on a pair of records I and II which are being advanced past a scanning region in the respective opposite directions A and A'. In the case of transient $W_1$ the onset of the transient is represented at the right thereof, while in the case of the transient $W_2$ the onset is represented at the left thereof. For initial simplicity, let it be assumed that the respective peaks $P_1$ and $P_2$ of these transients occur at the same time $t$ with respect to a zero time on the two records, so that if these records are to the same scale the zero of the record I is to the right of the peak $P_1$ to the same extent as the zero of the record II is to the left of its peak $P_2$. Let it be assumed, also, that a record III is being made as a function of time and, for simplicity, moves with the record II so that it has a corresponding time scale with the same zero.

It will be noted that the transients illustrated have mirror symmetry about their peaks $P_1$ and $P_2$. The transients illustrated are approximately the theoretical transient velocities due to a reflection of a seismic wave from a subsurface interface. Theoretically, such a transient has the mirror symmetry illustrated. Further, it should be considered that in accordance with the invention in its application to practical conditions the transients may not be in conformity with the theoretical. However, it has been found that there is to a considerable degree mirror symmetry even though such symmetry may be somewhat incomplete, and even though the transients may depart otherwise shapewise from the theoretical. The approximate symmetry is of significance as will appear.

The transients illustrated are velocity transients. As will be evident from inspection, the first derivative of one of these transients will not have mirror symmetry about the instant of occurrence of a peak $P_1$ or $P_2$, but will have skew symmetry about the instant of such peak of the velocity transient. If a magnetically recorded velocity transient is reproduced from the magnetic record (carrier modulation not being assumed involved), the reproduction will consist of such a first derivative. As will be evident, the invention is equally applicable to mirror symmetry and to skew symmetry, so that it is not material which type of record is involved in the correlation. It may be noted, in general, that considering an axis of symmetry, the successive derivatives of a function having one type of symmetry will alternate between mirror and skew symmetry. The invention, accordingly, is applicable to a transient having either type of symmetry and to any of its derivatives.

In accordance with the invention, the record III is provided in the form of a function of time $t$ as given in Equation 1 in FIGURE 4. For a given instant of time $t$, an integration is performed between limits of time ranging through intervals T on both sides of the time instant $t$. The integration in this interval is carried out in such fashion, that assuming the relatively movable records momentarily stopped, each value of transient $W_1$ is multiplied by the value of transient $W_2$ aligned therewith, this product is multiplied by a value of a weighting function $G(\tau)$, which value depends upon the position in the integration range, and the resulting products are integrated between the limits $-T$ and $T$. Considering the transients $W_1$ and $W_2$ to be represented respectively by the functions of time $f_1$ and $f_2$, it will be evident, that, $\tau$ being the variable of integration, the procedure just outlined gives rise to the function $\phi_{12}$ given in Expression 1 of FIGURE 4. The function, as will be obvious, is a function of $t$ and may be produced as such on the record III. Illustrated in full lines in the records I and II of FIGURE 2 are the conditions which exist when the mirror-symmetric transients $W_1$ and $W_2$ have their peaks in alignment. Under such conditions, the value of the correlation function $\phi_{12}$ will be at a maximum indicated at $P_3$ which is in this case a positive maximum. As time increases, and the transients $W_1$ and $W_2$ move to the dotted line positions illustrated, and the integration is carried out for the new value of $t$, there will be a corresponding value of the correlation function. Thus, there is produced an output in the form illustrated at III. There may now be discussed various matters concerning the nature of the integral which is recorded as the output of the integration system. Under conditions of alignment as illustrated, if the transients are mirror-symmetrical, the $f_1$ function of $\tau$ is equal to the $f_2$ function of $-\tau$, with the result that, considering $G(\tau)$ essentially positive, the integrand is positive so that the correlation function for the particular time is positive. Furthermore, for the general type of function illustrated in FIGURE 2, the correlation function will have a maximum value when there is coincidence, as illustrated by the full line positions of the transients.

On the other hand, if skew symmetry of the transients exists, then when they reach alignment of their axes of symmetry, the $f_1$ function of $\tau$ will be minus the $f_2$ function of $-\tau$, and the integrand will be negative and will have a maximum negative value for skew symmetric functions such as are here involved. In other words, providing a picture of the situation, the output correlation function illustrated in graph III would be inverted.

It will be noted from graph III that the output function as a function of time has twice the "frequency" of the transients $W_1$ and $W_2$, considering their positive and negative excursions to represent "frequency." Inspection of Equation 1 will reveal that, in general, this will be the case and may be readily recognized merely from consideration that the relative velocity of the two records is double the velocity of either.

The fact that the output correlation integral function has a large positive (or negative) peak at coincidence of the axes of symmetry provides substantial discrimination against noise. The "noise" accompanying the transients to be detected will generally have two components one of which may be referred to as random and the other of which may be referred to as continuous. In the case of the former, the probability is that between the limits of integration for any particular time $t$ there will be a low degree of "correlation" in the sense that the integrand between the limits will have positive and negative values tending to balance each other out with the result that the integral will have relatively small magnitude and with the high probability that substantial peaks due to such noise will be infrequent. The value of the integral due to such random noise, therefore, will be an irregular wave as a function of time but above which there will generally be recognizable not only the peaks due to alignment of the transients but also, usually, the characteristic waveform as the transients pass each other, such waveform being that illustrated in graph III.

Continuous noise, using continuous in the sense of an alternating signal persisting over a substantial interval, will produce an integral having a periodic variation with time at double the frequency of the continuous noise. Such noise is most usually due to a power frequency such as 60 cycles and will be approximately sinusoidal in character. As will be evident from considering Expression 1, sinusoidal functions will give rise to a sinusoidal integral of double frequency. The amplitude, however, will remain substantially constant over the interval in which the noise component remains substantially constant and will contribute to the combined result a component without salient peaks so that the continuous noise is distinguishable from the integral output corresponding to the transient coincidence.

There is thus an accentuation of the reflection transients recognizable against the components of the integral due to noise.

The weighting function $G(\tau)$ may be provided for two purposes. The first is merely that of smoothing out the ends of the integral to eliminate undesirable "end effects." The second is to correct to some extent as may be found necessary under conditions where there is substantial deviation from the mirror or skew symmetry. For most practical purposes, the weighting function may be substantially ignored and considered equal to unity.

In the foregoing, for simplicity there is made an assumption that the transient peaks $P_1$ and $P_2$ occurred at the same time in both records with respect to a common zero. This would, ordinarily, be a special situation though, usually, it would be approximated by the making of step-out, weathering and elevation corrections. Usually, even if weathering and elevation corrections were accurately made (these involving the shifting of the record as a whole with respect to time), step-out corrections can only be made on the basis of assumptions as to horizontal reflecting planes and particular velocities involved in the reflection paths. The approximate step-out corrections are not likely to align the reflections with respect to a common time scale, and, consequently, cross-correlation methods heretofore proposed generally provided only a check or test for proper time alignment. (It will be understood that the corrections referred to are made through the use of apparatus such as disclosed in the application of Bazzoni, Ellis & Winterhalter, Serial No. 339,882, now Patent No. 2,940,536, filed March 2, 1953, and the application of Lacoste G. Ellis, Serial No. 339,603, filed March 2, 1953, now abandoned.)

In accordance with the present method, it is desirable prior to application thereof to provide, for correlation, records which have been corrected for weathering, elevation and step-out. It might also be here remarked that it is usually desirable to provide some filtering particularly to remove sustained noise such as that occurring at power line frequencies. Filtering may also be accomplished to remove noise components which are of no interest, lying outside the component frequencies which appear in the reflection transients. However, filtering is desirably not carried out to such an extent as to seriously distort the reflection transients which it is desired to stress. Filtering may be carried out effectively and without deleterious results in accordance with said Cox application.

Figure 3:
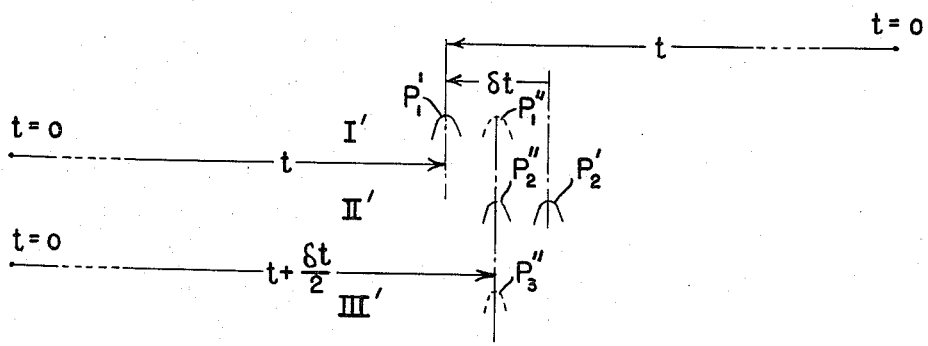
FIGURE 3 is a further diagram illustrative of the invention.

Assuming that corrections as above have been made, it could be expected that corresponding reflection transients on the two records would not be greatly displaced on the time scale, and FIGURE 3 is indicative of what might occur though even this figure, in general, would represent a rather exaggerated situation. In FIGURE 3, only the peaks of the transients are indicated and are designated as $P_1'$ and $P_2'$. As will be evident from the figure, referring to the graphs I' and II' corresponding to previous graphs I and II, the peak $P_2'$ is indicated as lagging the peak $P_1'$ by an interval $\delta t$. Under these conditions, there will not occur coincidence of the transients in the center of the integration range but, rather, coincidence will only occur as the transient peaks reach, respectively, the positions $P_1''$ and $P_2''$. If the integral record indicated at III' moves with the record II', the peak $P_3''$ of the integral will then occur at a time corresponding to $$t + \frac{\delta t}{2}$$

i.e., the time at which this peak occurs corresponds to the mean of the times of occurrence of the peaks of the transients. However, if the integration range is ample, this will make no difference in securing a peaked response indicative of the reflections though, finally, in examining the records the time deviation may be taken into account and may be then interpreted (in conjunction with results from other records) in terms, for example, of unusual velocity conditions, slope of the reflecting boundary, or the like. It may be noted that if there are correlated the records made by two adjacent detectors of a spread that the peaked response may be, for interpretation, ascribed, if desired, to a fictitious detector between the two giving the correlated records. The interval of integration is desirably not greatly in excess of the duration of the transient; but the interval is not critical and it should be sufficiently extended to encompass integration of the coincident transients when these are displaced in time to the extent of all reasonably expected displacements.

While the treatment of a pair of recorded channels has been particularly described, it will be evident that, in practice, it is advantageous to cross-correlate in the fashion indicated a greater number of records or recorded channels to secure accentuation of reflections and certainty of interpretability. For example, the integral records resulting from the cross-correlation of pairs of original records may, in turn, be subjected to cross-correlation between themselves. Thereby, a third record would be obtained in which still more accentuation of the desired transients against background noise would occur. It may here be noted that the records correlated need not be made from the same shot or other origin of a seismic wave, but correlation may be desirably effected between records made quite independently in the same general region.

The integration defined in Expression 1 assumes that with $t$ constant the integration is carried out for a variation of $\tau$ from $-T$ to $+T$. While this may be accomplished, for example, by the use of variable density records and photocell pickups with light integration along lines described in said Cox application, or even in the case of magnetic records by running them so that $t$ varies slowly while scanning takes place rapidly for the variation of $\tau$, it is at the present time most convenient to use magnetically recorded records and operational difficulties are greatly reduced by approximating the integration indicated in Expression 1. The approximation may be carried out to a high degree, but generally even attempts at very close approximation of the integral are not justified by reason of corresponding betterment of results. Considering that all that is desired is the indication of transients above noise level and taking into account the fact that the reflection transients themselves may well not be completely symmetrical, quite sufficient degree of approximation to the integral is secured by summation of products of ordinates, the approximation being mathematically expressible as indicated in Expression 2 in FIGURE 4.

Figure 1:
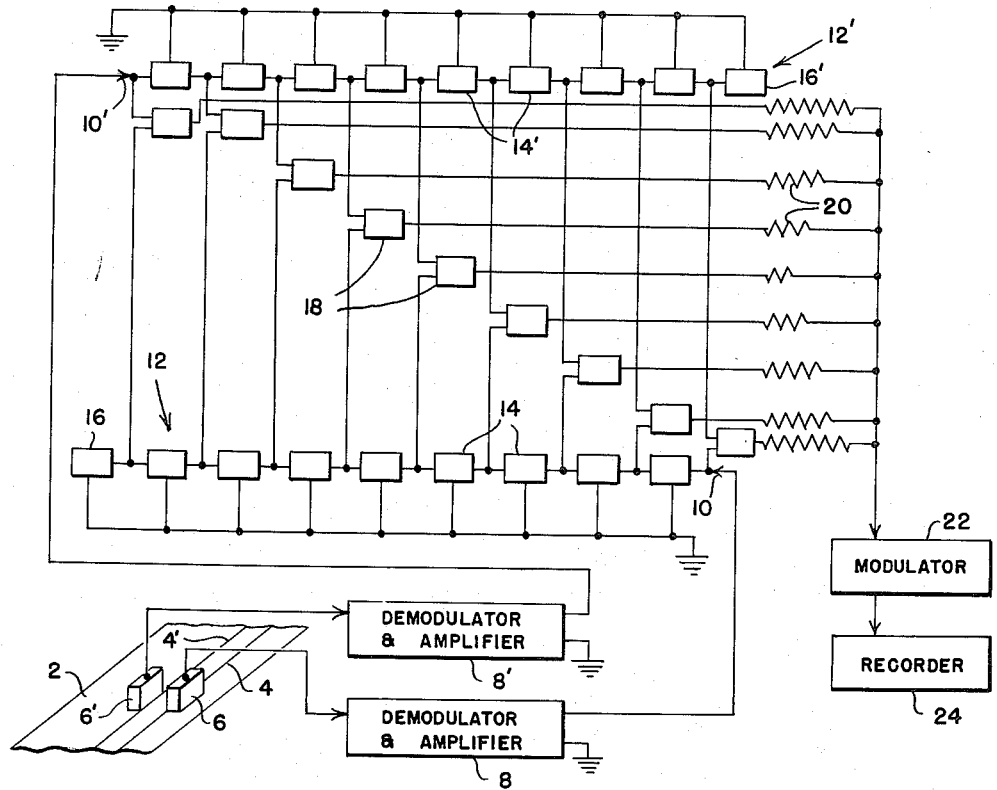
FIGURE 1 is a diagram showing a preferred form of apparatus used in carrying out the invention.

FIGURE 1 shows a preferred type of apparatus for accomplishing such an approximation by summation of products. A magnetic record member 2 is illustrated as carrying side by side magnetic seismic records 4 and 4' which may be assumed to have been corrected by the methods and means heretofore indicated with respect to weathering, elevation and step-out. In general, it is desirable to have the records in the form of modulated carriers so that in the pickup procedure the phase shift involved is only that of carrier cycles with negligible phase shift of the modulating seismic signal. Before being subjected to the approximate integration procedure, however, the signals must be demodulated and, usually, the seismic signals independently amplified and, for this reason, the pickup heads 6 and 6' deliver their signals to the demodulator and amplifier units 8 and 8' from which they are delivered to respective delay lines at 10 and 10', the delay lines being generally indicated at 12 and 12'. The delay lines comprise delay elements 14 and 14' and terminate in elements 16 and 16' having the characteristic impedances of the delay lines to eliminate reflections. The junctions of the sections 14 and 14' of the delay lines are tapped by connections to multipliers 18 which may be of any desired type, for example, as shown in the application of Blake and Cox, Serial No. 495,264, now Patent No. 2,835,444, filed March 18, 1955. The outputs from the multipliers 18 are delivered through attenuating resistors 20 which have values corresponding to values of the weighting function. The outputs from the resistors 20 are delivered to a common line (by virtue of which summing takes place) and to a modulator 22 wherein a suitable carrier is modulated by the summed output, the modulator delivering its modulated signal to a magnetic recorder indicated at 24 or to an oscillograph. As diagrammed, the inputs to the delay lines move oppositely therethrough and the multipliers 18 are fed from corresponding junctions of the delay lines so that, as will be evident from again considering FIGURE 2, the products when coincidence occurs are of values of the transients respectively preceding and following the time axis of symmetry. (Of course, the physical arrangement of the apparatus is not of significance and the reference to the travelling of the signals in opposite directions through the delay lines is solely from an electrical or time standpoint.)

It will be clear that the apparatus disclosed carries out the summation indicated in Expression 2 wherein $n$ represents the number of delay line junctions on each side of their centers, $\Delta t$ represents the time delay of each delay line section, $k$ represents the numbers ascribed to the sections which run from $-n$ to $n$, and the function represented by G corresponds to the spaced values of the general function in Expression 1 taken at the junctions. The functions $f_1$ and $f_2$ are, of course, the functions representing the reflection transients and the accompanying noise. The approximation so provided may be made as close as desired merely by increasing the number of delay line sections with corresponding decrease of the individual delays of the sections. However, excellent approximations are secured even if the number of sections is relatively small, and, in fact, as will shortly appear, very satisfactory results may be attained by having no more than the equivalent of a single section and two junctions.

While multipliers of the type described in said Blake and Cox application may be used and are individually simple, there may even be used an approximation to multiplication. Such an approximation is indicated in FIGURE 5.

In the transformer 26 in this figure the inputs corresponding to $f_1$ and $f_2$ are added to produce at an output winding 30 a signal corresponding to their sum. In the transformer 28 the same inputs are subtracted to provide from the secondary 32 their difference, the windings of the primary coils being oppositely relatively disposed in the two transformers. The two outputs are respectively subjected to full wave rectification in the rectifiers 34 and 36, of opposed output polarities, giving rise to the positive and negative absolute values, respectively, of the sum and difference. These are then added algebraically in the resistance network comprising resistors 38 and 40, so that delivery through a resistor 20' corresponding to a resistor 20 corresponds to the difference of the absolute values multiplied by the weighting function G. The integral expression for this approximation is given at (3) in FIGURE 4, and the corresponding summation at (4) in FIGURE 4. From the practical standpoint, the summation approximation is desirable, and it will be understood that in FIGURE 5 the $\tau$ corresponds actually to $K\Delta t$ in Expression 4. It will be found that the function represented by the difference of the absolute values of the sum and difference of the functions is a fair practical approximation to the product, amply sufficient for the purpose involved of securing an accentuation of coincidence of the reflection transients against the background noise.

Figure 6:
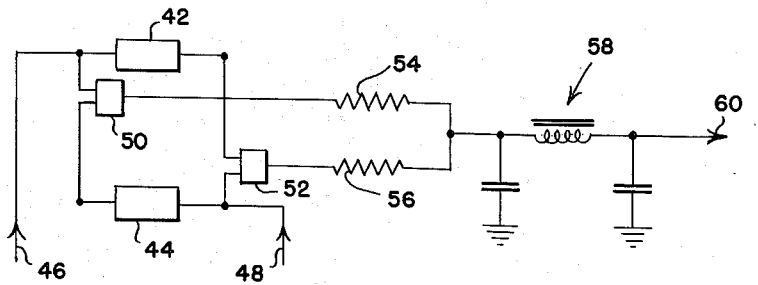
FIGURE 6 is a wiring diagram showing apparatus for simplified time averaging.

In fact, the relatively crude approximation represented in Expression 5 has been found to give quite acceptable results, this, as will be obvious, representing no more than the reduction of each of the delay lines in FIGURE 1 to a single section flanked by a pair of junctions, the delay time of each of the single sections being $\tau_0$. Somewhat better results are attainable, however, by providing time averaging (low-pass filtering) of the output of such an arrangement, and this is indicated in FIGURE 6, in which delay sections 42 and 44 receive inputs at 46 and 48 from the demodulator and amplifier units such as shown in FIGURE 1, and the ends of the delay "lines" feed the multipliers 50 and 52 (which may be of the type illustrated in FIGURE 5), the products, or approximate products, being added through resistors 54 and 56 and the sum fed to a simple integrating arrangement which may take the form of no more than a suitable filter 58 to give an output at 60 which may be fed to a modulator such as 22 and then recorded. If the integrator 58 has a suitable time constant, there occurs an approximation to extended integration resulting in accentuation of the coincidences of the reflection transients against background noise.

While the cross-correlation of seismic records has been stressed, it is evident that records of generally similar type may also be cross-correlated through the use of the methods and apparatus herein disclosed. For example, well logs made by any of the known electrical, acoustic, radioactive, or other methods may be recorded on magnetic tapes and correlated in precisely the same fashion as that herein described.

What is claimed is:

1. Apparatus for the correlation of a pair of records of dependent variables as functions of an independent variable, to provide an approximation of the expression $$\frac{1}{2T}\int_{-T}^{T} f_1(t+\tau) \cdot f_2(t-\tau) \cdot G(\tau) d\tau$$

wherein $t$ is the independent variable, $\tau$ is the variable of integration, T and $-T$ are the limits of integration, and $f_1$ and $f_2$ are the functions, comprising means for simultaneously scanning said records in corresponding regions of said independent variable and providing outputs corresponding to said dependent variables, and means connected to said scanning means, receiving said outputs, and providing at any instant at least two approximate products, one of which is of a value of the first of said dependent variables, corresponding to a value of said independent variable smaller than a predetermined value thereof corresponding to said instant, with a value of the second of said dependent variables, corresponding to a value of said independent variable greater than said predetermined value thereof, and another of which is of a value of the first of said dependent variables, corresponding to a value of said independent variable larger than said predetermined value thereof, with a value of the second of said dependent variables smaller than said predetermined value thereof, means for receiving from the last mentioned means and summing at least two of said products, and means for receiving from said summing means the sum of said products with respect to the independent variable.

2. Apparatus according to claim 1 in which said smaller and greater values of the independent variable are, in the case of each product, substantially equally spaced from said predetermined value thereof.

3. Apparatus for the correlation of a pair of records of dependent variables as functions of an independent variable, to provide an approximation of the expression $$\frac{1}{2T}\int_{-T}^{T} f_1(t+\tau) \cdot f_2(t-\tau) \cdot G(\tau) \cdot d\tau$$

wherein $t$ is the independent variable, $\tau$ is the variable of integration, T and −T are the limits of integration, and $f_1$ and $f_2$ are the functions, comprising means for simultaneously scanning said records in corresponding regions of said independent variable, and means connected to said scanning means, receiving outputs therefrom, and providing at any instant an approximate value of the integral, throughout said regions, and with respect to the independent variable of products of values of each of said dependent variables, corresponding to values of said independent variable smaller than a predetermined value thereof corresponding to said instant, with values of the other of said dependent variables corresponding to values of said independent variable larger than said predetermined value thereof.

4. Apparatus according to claim 3 in which said smaller and larger values of the independent variable are, in the case of each product, substantially equally spaced from said predetermined value thereof.

5. Apparatus according to claim 3 in which said scanning means comprises means for transforming said records into electrical signals with time corresponding to said independent variable, and a pair of delay lines receiving said signals, and in which the means connected to said scanning means comprises a plurality of means for effecting at least approximate multiplication of outputs from said delay lines to supply said products, and means receiving said products from said multiplication means and for summing said products.

6. Apparatus according to claim 4 in which said scanning means comprises means for transforming said records into electrical signals with time corresponding to said independent variable, and a pair of delay lines receiving said signals, and in which the means connected to said scanning means comprises a plurality of means for effecting at least approximate multiplication of outputs from said delay lines to supply said products, and means receiving said products from said multiplication means and for summing said products.

7. Apparatus for the correlation of a pair of records of dependent variables as functions of an independent variable, to provide an approximation of the expression $$\frac{1}{2T}\int_{-T}^{T} f_1(t+\tau) \cdot f_2(t-\tau) \cdot G(\tau) \cdot d\tau$$

wherein $t$ is the independent variable, $\tau$ is the variable of integration, T and −T are the limits of integration, and $f_1$ and $f_2$ are the functions, comprising means for simultaneously scanning said records in corresponding regions of said independent variable, and means connected to said scanning means, receiving outputs thereof, and providing at any instant at least two approximate products, one of which is of a value of the first of said dependent variables, corresponding to a value of said independent variable smaller than a predetermined value thereof corresponding to said instant, with a value of the second of said dependent variables, corresponding to a value of said independent variable greater than said predetermined value thereof, and another of which is of a value of the first of said dependent variables, corresponding to a value of said independent variable greater than said predetermined value thereof, with a value of the second of said dependent variables smaller than said predetermined value thereof, and means for receiving from the last mentioned means and summing at least two of said products.

8. Apparatus according to claim 7 in which said smaller and greater values of the independent variable are, in the case of each product, substantially equally spaced from said predetermined value thereof.

9. Apparatus according to claim 7 in which said scanning means comprises means for transforming said records into electrical signals with time corresponding to said independent variable, and a pair of delay elements receiving said signals, and in which the means connected to said scanning means comprises at least a pair of means for effecting at least approximate multiplication of outputs from the terminals of said delay elements to provide said products.

10. Apparatus according to claim 7 in which the number of said approximate products provided and summed is in excess of two so that the summing provides approximate integration, with respect to the independent variable, of such products through said corresponding regions.

11. Apparatus according to claim 8 in which the number of said approximate producte provided and summed is in excess of two so that the summing provides approximate integration, with respect to the independent variable, of such products through said corresponding regions.

References Cited in the file of this patent

UNITED STATES PATENTS

| | | |
|---|---|---|
| 2,656,102 | Redheffer | Oct. 20, 1953 |
| 2,676,206 | Bennett et al. | Apr. 20, 1954 |
| 2,779,428 | Silverman | Jan. 29, 1957 |
| 2,794,965 | Yost | June 4, 1957 |
| 2,854,191 | Raisbeck | Sept. 30, 1958 |

OTHER REFERENCES

A Computer for Correlation Functions (Brook and Smith), "The Review of Scientific Instruments," vol. 23, No. 1, March 1952.